March 7, 1933.   A. KÖNIG   1,900,241
REVERSING PRISM SYSTEM AFFORDING PARALLEL VISION
Filed July 31, 1930
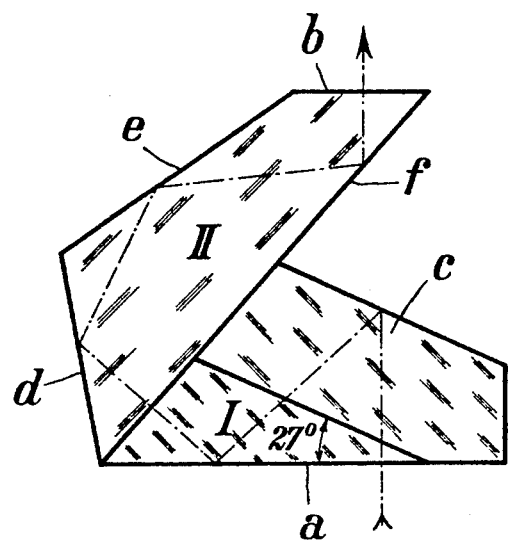
Inventor:
Albert König Patented Mar. 7, 1933

1,900,241

UNITED STATES PATENT OFFICE

ALBERT KÖNIG, OF JENA, GERMANY, ASSIGNOR TO FIRM CARL ZEISS, OF JENA, GERMANY

REVERSING PRISM SYSTEM AFFORDING PARALLEL VISION

Application filed July 31, 1930, Serial No. 472,004, and in Germany August 3, 1929.

I have filed an application in Germany, August 3, 1929.

The invention concerns a reversing prism system affording parallel vision and having only two ray-traversing surfaces that are bounded by the air and six totally reflecting, and therefore unsilvered, surfaces which are arranged in such a manner that all reflections take place in one plane and whereof two are roof surfaces.

To obtain a prism system of this kind in which the distance between the entering and the emerging ray is comparatively small or eventually even zero, the invention provides that one of the said two ray-traversing surfaces serves at the same time as one of the four reflecting surfaces which do not belong to the roof and that the roof is so arranged that a ray passing through the said ray-traversing surface and entering the prism system first strikes the roof and is thereupon reflected directly on the said ray-traversing surface. Moreover, the angle enclosed by this ray-traversing surface and the adjacent simple reflecting surface is smaller than 110°.

In the executional example represented by the accompanying drawing the prism system consists of two parts, I and II, which are cemented together. Of the ray-traversing surfaces, which are designated $a$ and $b$, $a$ serves also as a reflecting surface. Other reflecting surfaces are the roof $c$ which is next to the ray-traversing surface $a$ and is inclined towards the same by an angle of 27°, and three simple reflecting surfaces $d$, $e$, and $f$. All reflecting surfaces are unsilvered. The angle between the surfaces $a$ and $d$ is 107°.

I claim:

A reversing prism system comprising two prisms, each prism having four plane polished surfaces, the four polished surfaces of one of the two prisms being such that the first surface serves for ray traversion as well as for total reflexion, that the second and third surfaces, which form a roof, serve only for total reflexion, and that the fourth surface serves only for ray traversion, the four polished surfaces of the other of the two prisms being such that the first surface serves for ray traversion, that the second and third surfaces serve only for total reflexion, and that the fourth surface serves for ray traversion as well as for total reflexion, the eight polished surfaces of the said two prisms being so arranged relatively to each other that the said first surfaces of the two prisms are parallel to each other and that the totally reflecting surfaces are adapted to deflect in one and the same plane a ray entering one of the said two parallel surfaces of the prism system perpendicularly to these two surfaces, the said fourth surfaces of the two prisms being cemented together.

ALBERT KÖNIG.